United States Patent [19]

Keener

[11] 4,377,909

[45] Mar. 29, 1983

[54] RECIPROCAL SAW ATTACHMENT FOR POWER OUTPUT SHAFT AND PORTABLE DRILL VISE

[76] Inventor: Neil F. Keener, P.O. Box 614, Jemez Springs, N. Mex. 87025

[21] Appl. No.: 235,717

[22] Filed: Feb. 18, 1981

[51] Int. Cl.³ .......................................... B27B 19/09
[52] U.S. Cl. ....................................... 30/372; 30/92; 30/500; 30/392
[58] Field of Search ............... 30/372, 392, 393, 500, 30/166 R, 92; 144/1 E, 1 F, 35 A; 408/20

[56] References Cited

U.S. PATENT DOCUMENTS

| 817,513 | 4/1906 | Parker | 269/43 |
|---|---|---|---|
| 1,997,619 | 4/1935 | Windle | 30/393 |
| 2,282,728 | 5/1942 | Kern | 30/392 |
| 2,329,729 | 9/1943 | Saucke | 30/372 X |
| 2,563,069 | 8/1951 | Roberts | 30/372 X |
| 2,794,463 | 6/1957 | Ford | 144/35 A |
| 3,834,019 | 9/1974 | Smeltzer | 30/92 |
| 4,317,280 | 3/1982 | Krieg | 30/92 |

*Primary Examiner*—Jimmy C. Peters
*Attorney, Agent, or Firm*—Harvey B. Jacobson

[57] ABSTRACT

Driven and idle sprocket wheels are journaled in aligned relation for rotation about spaced apart parallel axes and a chain is trained over the sprocket wheels. The sprocket wheels are journaled from a support structure and the latter includes an elongated support member guidingly supported therefrom for rectilinear reciprocation along a path generally paralleling the reaches of the chain extending between the sprocket wheels. The support member includes structure for supporting a hacksaw blade or other similar elongated cutting tool therefrom in position generally paralleling the support member and also includes laterally extending guide structure supported therefrom defining an elongated slot extending generally normal to the support member and the chain includes a laterally projecting pin rotatably and slidably received in the guide structure slot, whereby orbital movement of the chain supported pin about the sprocket wheels will effect longitudinal reciprocation of the support member in a manner such that the support member is initially gradually accelerated to a predeterminined speed of movement in a first direction, thereafter maintained at that speed of movement in the first direction and subsequently gradually decreased in speed before being gradually accelerated in the opposite direction. Clamp structure is provided for supporting a portable drill in position for driving connection of its output shaft with one of the sprocket wheels.

19 Claims, 12 Drawing Figures

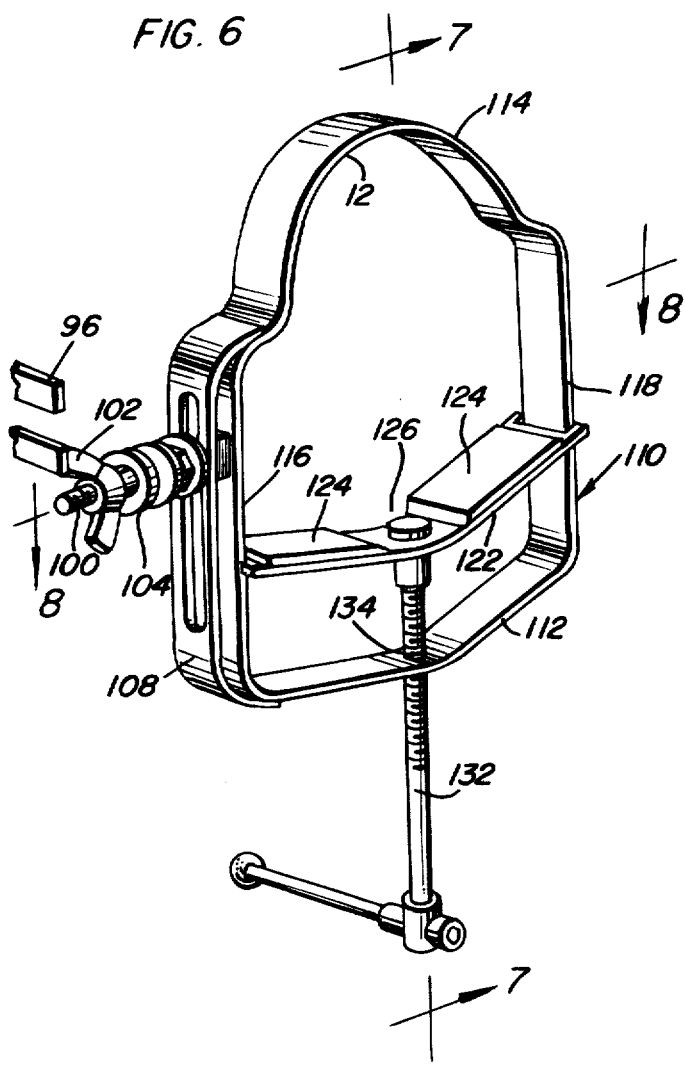
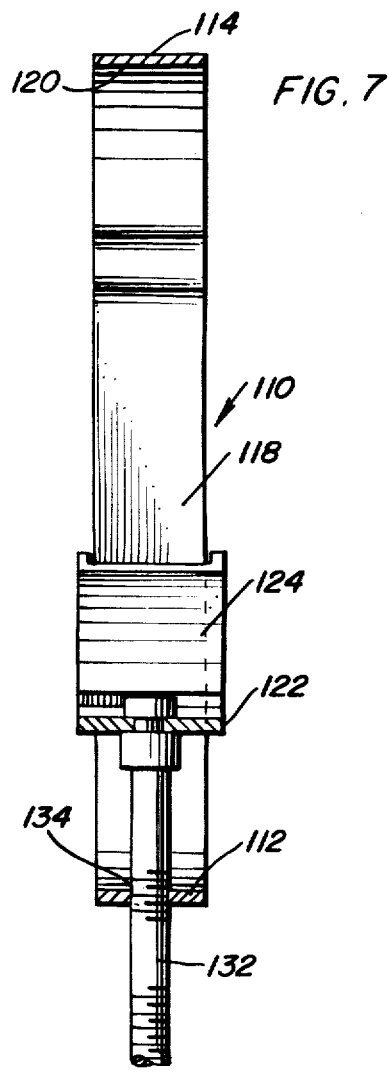
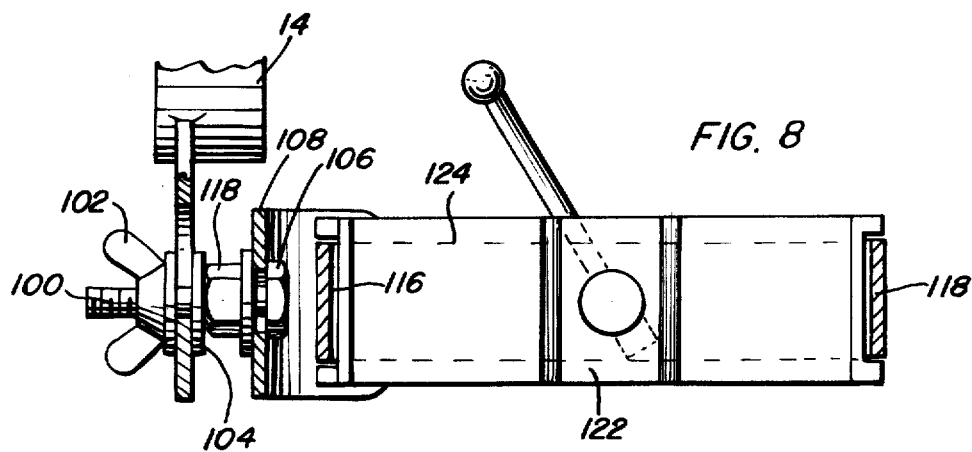

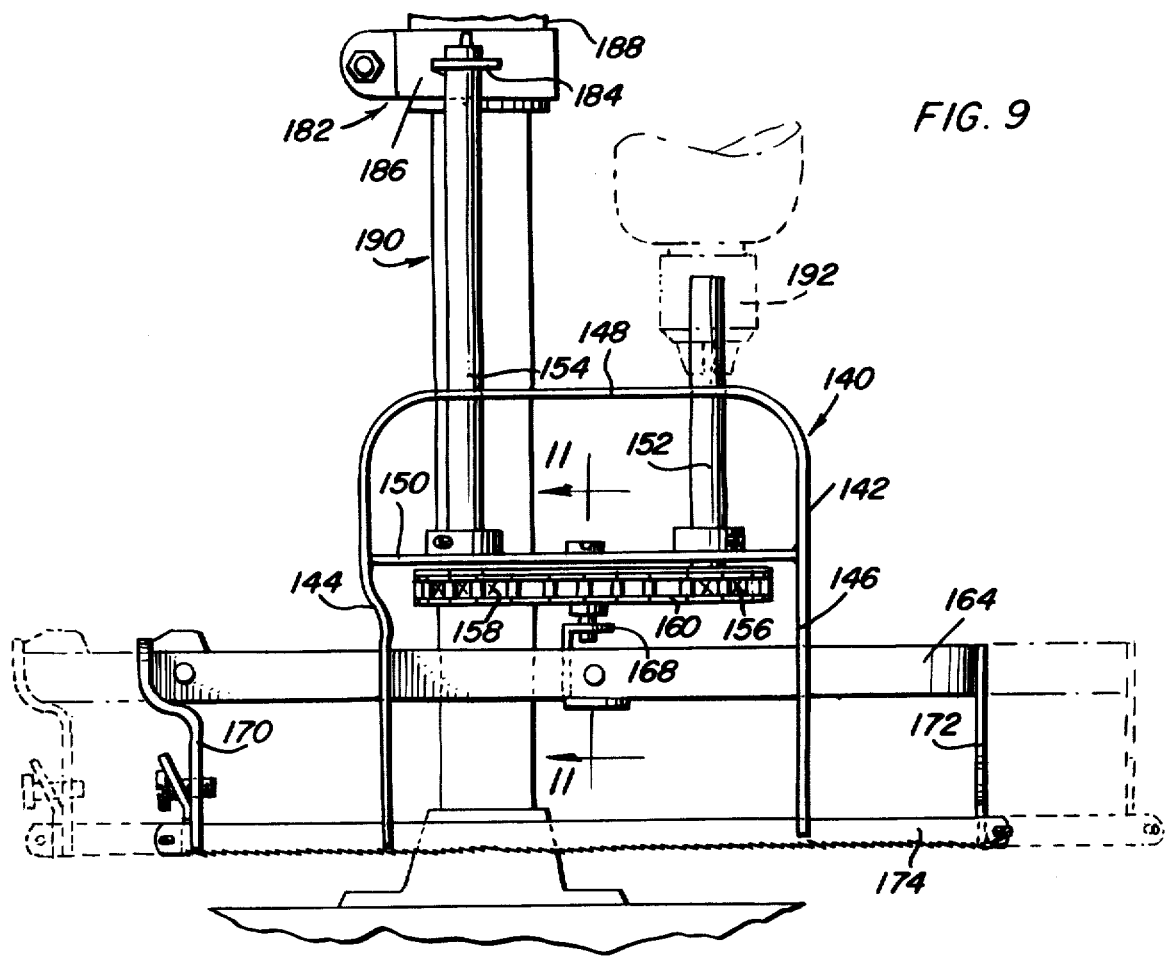
FIG. 9
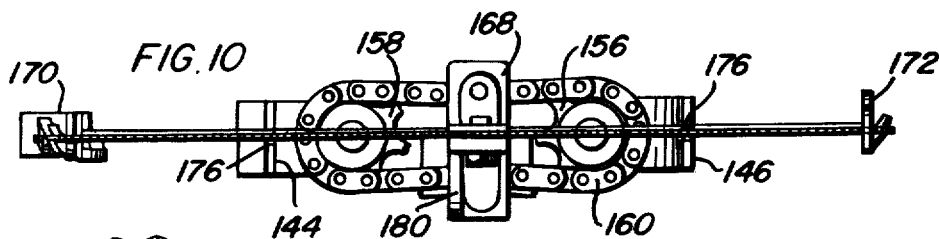
FIG. 10
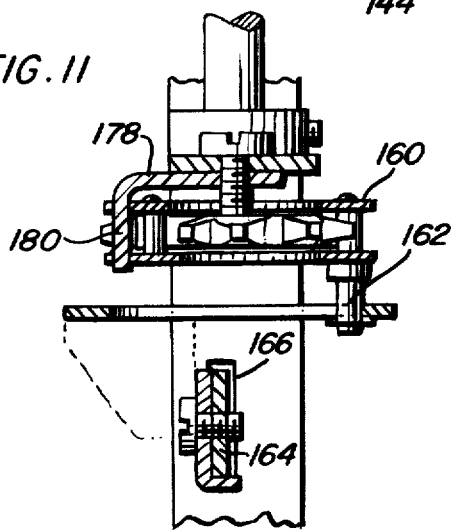
FIG. 11
FIG. 12

RECIPROCAL SAW ATTACHMENT FOR POWER OUTPUT SHAFT AND PORTABLE DRILL VISE

BACKGROUND OF THE INVENTION

Various forms of saw-type cutting attachments heretofore have been provided for use in conjunction with power units including rotary output shafts. Examples of these previously known form of attachments are disclosed in U.S. Pat. Nos. 2,175,499, 2,621,685, 2,625,964, 2,668,567, 2,686,351, 2,816,583, 3,130,759, 3,398,588, 3,677,313, 3,807,242, 3,876,015 and 4,111,060.

However, these previously known forms of attachments are not capable of reciprocating a tool, in response to substantially constant rotary input torque, at substantially constant speed throughout major portions of the opposite directional strokes of the tool. Inasmuch as such constant speed movement greatly facilitates the cutting action of many types of reciprocal saw blades, a need therefore exists for a reciprocal saw attachment for rotary output shaft equipped power tools.

BRIEF DESCRIPTION OF THE INVENTION

The reciprocal saw attachment of the instant invention includes a first form specifically designed to be utilized in conjunction with a powered hand drill and a second form specifically designed for use in conjunction with a drill press. In addition, a mounting bracket is provided for use in conjunction with the first form whereby a conventional powered hand drill may be supported in operative association with the first form for powering the same.

The main object of this invention is to provide a saw attachment for a power tool of the type including a rotary power output shaft.

Another object of this invention is to provide a reciprocal saw attachment in accordance with the preceding object and constructed in a manner whereby the reciprocal saw portion thereof may be rectilinearly reciprocated at substantially constant speed in response to constant speed rotary torque input.

Yet another object of this invention is to provide a reciprocal saw attachment specifically designed for use in conjunction with a powered hand drill.

A still further object of this invention is to provide a reciprocal saw attachment specifically designed for utilization in conjunction with a drill press.

Another important object of this invention is to provide a reciprocal saw attachment for actuation by a power hand drill and including support structure whereby the power drill may be stationarily mounted in operative association with the reciprocal saw attachment.

A final object of this invention to be specifically enumerated herein is to provide a reciprocal saw attachment in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a perspective view of the powered hand drill supporting clamp assembly which may be utilized in conjunction with the reciprocal saw attachment illustrated in FIGS. 1 through 5;

FIG. 7 is an enlarged fragmentary vertical sectional view taken substantially upon the plane indicated by the section line 7—7 of FIG. 6;

FIG. 8 is an enlarged horizontal sectional view taken substantially upon the plane indicated by the section line 8—8 of FIG. 7;

FIG. 9 is a side elevational view of the second form of reciprocal saw attachment illustrated in operative association with a drill press;

FIG. 10 is a bottom plan view of the attachment illustrated in FIG. 9;

FIG. 11 is an enlarged fragmentary vertical sectional view taken substantially upon the plane indicated by the section line 11—11 of FIG. 9; and FIG. 12 is a perspective view of the combined brace arm and clamp structure of the second form of reciprocal saw attachment illustrated in FIGS. 9, 10 and 11.

DETAILED DESCRIPTION OF THE INVENTION

Figure 1:
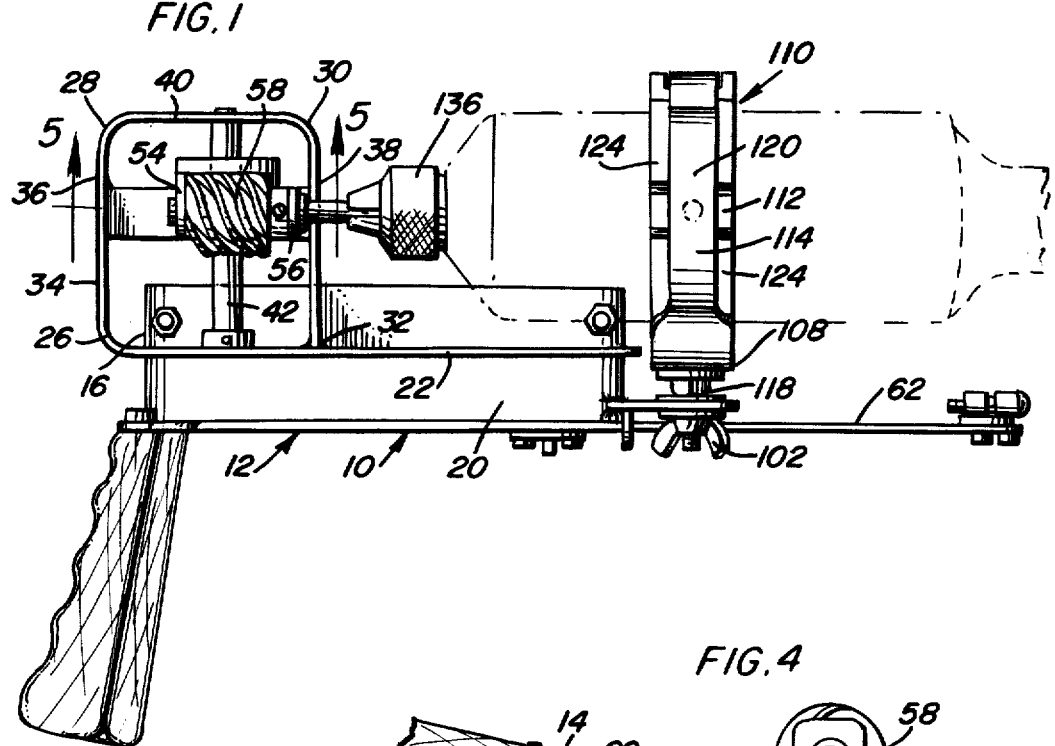
FIG. 1 is a top plan view of the first form of reciprocal saw attachment of the instant invention and with the powered hand drill mounting clamp of the instant invention operatively associated therewith.
Figure 4:
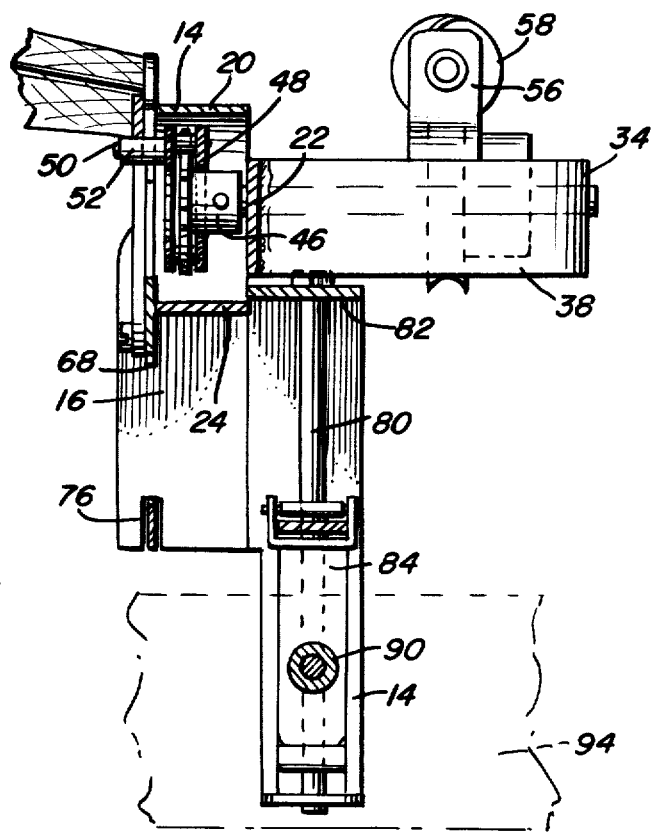
FIG. 4 is an enlarged fragmentary transverse vertical sectional view taken substantially upon the plane indicated by the section line 4—4 of FIG. 2.
Figure 5:
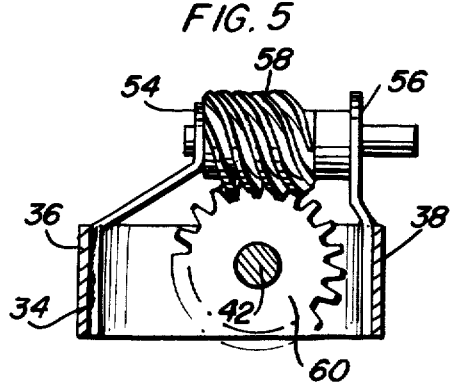
FIG. 5 is an enlarged fragmentary sectional view taken substantially upon the plane indicated by the section line 5—5 of FIG. 1.

Referring now more specifically to FIGS. 1 through 5 of the drawings, there may be seen a first form of reciprocal saw attachment referred to in general by the reference numeral 10. The attachment 10 includes a support structure referred to in general by the reference numeral 12 and defining a substantially U-shaped frame 14 including a pair of generally parallel legs 16 and 18 interconnected at one pair of corresponding ends by a bight portion 20 extending therebetween and formed integrally therewith. A bracing plate 22 extends between and interconnects corresponding side portions of the legs 16 and 18 closely adjacent the bight portion 20 and an additional bracing plate 24 is also secured between the legs 16 and 18 spaced on the side of the bracing plate 22 remote from the bight portion 20. One end of the bracing plate 22 extends outwardly beyond the leg 16 and includes three longitudinally spaced 90° bends 26, 28 and 30 therein and the free end of the bracing plate 22 is abutted against the portion thereof spanning the legs 16 and 18 and is welded thereto as at 32. Accordingly, a generally rectangular mounting frame 34 is defined, including front and rear portions 36 and 38 and an outer portion 40 extending between the outer ends of the front and rear portions 36 and 38.

A rotary input shaft 42 is centered between and is journaled from the outer portion 40 and the opposing portion of the bracing plate 22 with the shaft 42 extending through the bracing plate 22 and having a first powered sprocket wheel 44 mounted thereon. A second idle sprocket wheel 46 is journaled from the bracing plate 22 aligned with the sprocket wheel 44 and an endless link chain 48 is trained about the sprocket wheels 44 and 46 and includes a laterally horizontally outwardly projecting pin 50 having a bearing roller 52 journaled thereon.

The front and rear portions 36 and 38 of the mounting frame 34 include mounting lug portions 54 and 56 which rotatably journal the opposite end stub shaft portions of a worm gear 58 and the worm gear 58 is meshed with a worm wheel 60 mounted on the shaft 42.

An elongated support member 62 is provided and includes opposite end portions 64 and 66 slidably and guidingly received through aligned openings 68 formed in the legs 16 and 18. The opposite end portions 64 and 66 include tool mounting structure in the form of depending support arms 70 and 72 supported therefrom and the lower ends of the support arms 70 and 72 removably support the opposite ends of a hacksaw blade 74 therefrom. The lower terminal ends of the legs 16 and 18 include downwardly opening slots 76 formed therein which slidably engage opposite end portions of the blade 74.

The lower ends of the legs 16 and 18 include laterally directed portions 78 projecting toward each other and from which the lower ends of a pair of parallel guide pins 80 are supported. The upper ends of the guide pins 80 are supported from opposite end portions of a cross member 82 extending between the legs 16 and 18 and a generally inverted U-shaped frame 84 is slidably supported from the guide pins 80 and includes a first leg 86 opposed by an abutment plate 88 slidably supported from the frame 84 for shifting toward and away from the leg 86. A jack screw assembly 90 is operatively connected between the abutment plate 88 and the second leg 92 of the frame 84 and may therefore be utilized to adjustably shift the abutment plate 88 toward and away from the leg 86 whereby to clamp a workpiece 94 between the abutment plate 88 and the leg 86. Of course, if the workpiece 94 is stationarily supported, the slidable mounting of the frame 84 from the guide pins 80 has the effect of slidably supporting the entire support structure 12 from the workpiece 94 in a manner such that the weight of the attachment, independent of the frame 84, serves to advance the blade 74 downwardly upon the workpiece 94.

The adjacent ends of the leg 18 and the bight portion 20 support a mounting lug 96 therefrom which is notched as at 98 and clamp-type mounting stud 100, see FIGS. 2, 6, 7 and 8, is clamped in the notch 98 through the utilization of a wing nut 102 and an abutment washer 104. The mounting stud 100 includes a head 106 on the end thereof remote from the wing nut 102 and the adjacent portion of the stud 100 is slidably received in a slotted bracket 108 of a mounting frame referred to in general by the reference 110. The mounting frame 110 includes opposite end portions 112 and 114 interconnected by opposite side portions 116 and 118. The slotted bracket 108 is supported from and extends longitudinally of the side portion 116 of the frame 110 and the mounting stud 100 has a jam nut 118 threaded thereon whereby the mounting shank 100 may be adjustably stationarily positioned longitudinally of the slotted bracket 108. Of course, the wing nut 102 may be tightened and loosened to mount the frame 110 on the attachment 10 and to release the frame 110 from engagement with the attachment 10.

The end portion 114 includes an arcuate midportion 120 which opens toward the end portion 112 and the frame 110 includes an elongated clamp member 122 extending between and having its opposite ends guidingly engaged with the parallel opposite side portions 116 and 118 of the frame 110. The clamp member opposite end portions include abutment pads 124 and the clamp member 122, between the abutment pads 124, defines a recess 126 opening toward the arcuate midportion 120 whereby the body 128 of an electric hand drill referred to in general by the reference numeral 130 may be clampingly supported between the clamp member 122 and the arcuate midportion 120. An elongated clamp screw 132 has one end thereof rotatably supported from the midportion of the clamp member 122 against axial displacement relative thereto and the clamp screw 132 is threadedly engaged with the midportion of the end portion 112 as at 134.

Figure 2:
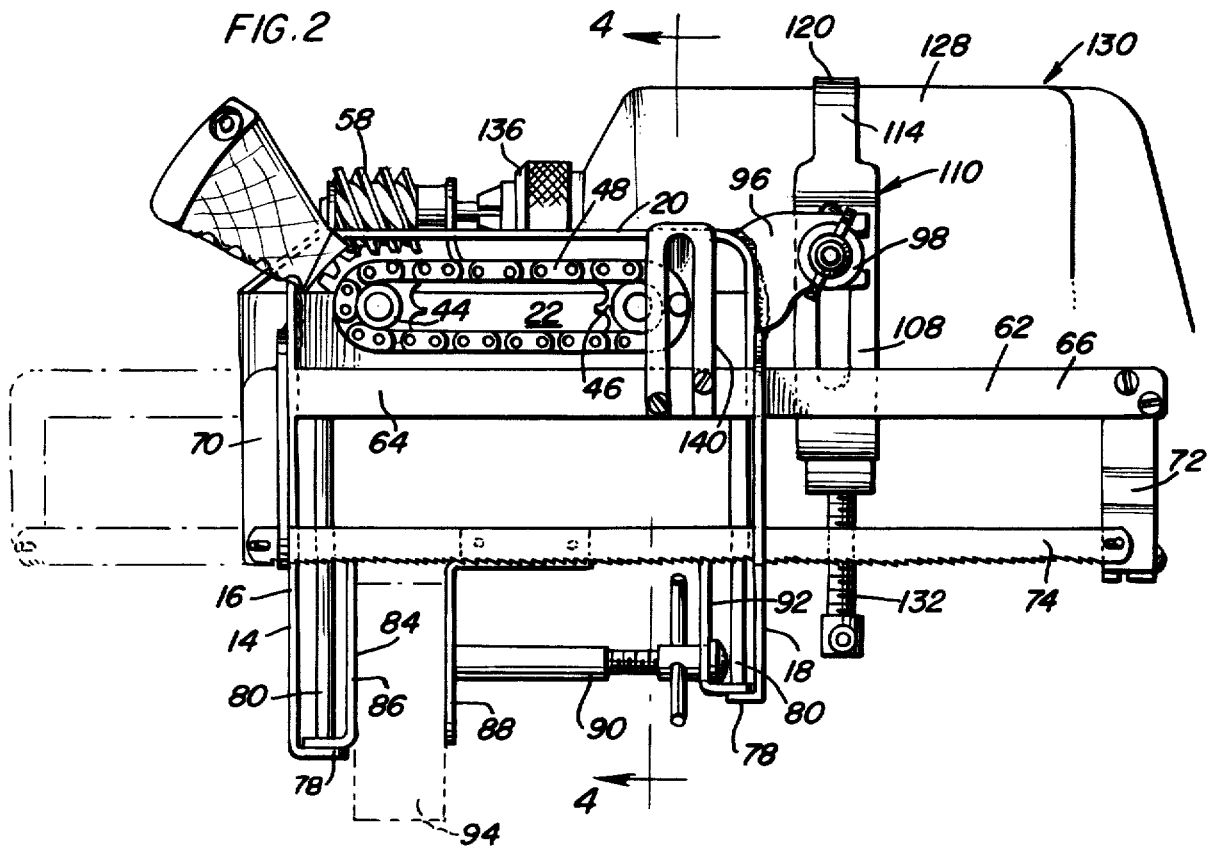
FIG. 2 is a side elevational view of the assemblage illustrated in FIG. 1.
Figure 3:
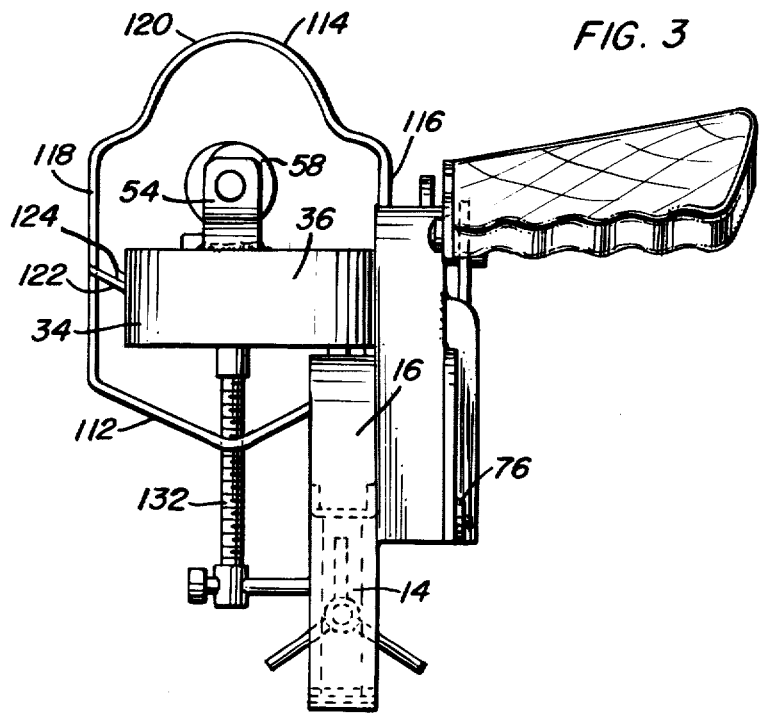
FIG. 3 is an end elevational view of the assemblage illustrated in FIG. 1 as seen from the left side thereof.

In operation, the electric hand drill 130 is clamped in the frame 110 between the clamp member 122 and the arcuate midportion 120 in a manner which is believed to be obvious from FIGS. 1 and 2 of the drawings. The frame 110 is then supported from the mounting lug 96 with the mounting shank 110 adjustably positioned along the slotted bracket 108 in order to enable the chuck 136 of the drill 130 to be operably connected to the adjacent stub shaft portion of the worm gear 58. Thereafter, rotation of the chuck 136 and the worm gear 58 will cause the chain 48 to orbit around the gear wheels 44 and 46. The support member 62 includes an upstanding slotted bracket 140 supported therefrom in which the roller 52 carried by the pin 50 is received. Accordingly, as the chain 48 orbits about the gear wheels 44 and 46, the support member 62 and the blade 74 are rectilinearly reciprocated and the weight of the entire assembly heretofore described, exclusive of the frame 84, serves to downwardly advance the blade 74 against the workpiece 94.

From a consideration of the operable connection between the chain supported roller 52 and the slotted bracket 140 carried by the support members 62, it will be noted that the blade 74 is gradually accelerated in a first direction, thereafter moved at a constant speed and then decelerated before subsequently being gradually accelerated in the second direction. In this manner, movement of the blade 74 is at a constant rate in opposite directions throughout movement of the bracket 140 between parallel vertical planes passing through the axes of rotation of the sprocket wheels 44 and 46.

With attention invited more specifically to FIGS. 9 through 12 of the drawings, there will be seen a second form of attachment referred to in general by the reference numberal 140 and including a U-shaped frame 142 generally similar to the frame 14 in that it includes a pair of legs 144 and 146 interconnected at one pair of corresponding ends by a bight portion 148 and further includes a brace 150 extending and secured between the legs 144 and 146.

The bight portion 148 and brace 150 rotatably journal input and idle shafts 152 and 154 therefrom having sprocket wheels 156 and 158 mounted thereon and a chain 160 is trained about the sprocket wheels 156 and 158. The chain 160 supports a pin mounted roller 162 therefrom corresponding to the roller 52 and an elongated support member 164 corresponding to the support member 62 is guidingly supported from the legs 144 and 146 for rectilinear reciprocation through openings or slots 156 corresponding to the slots 68. A slotted bracket 168 corresponding to the bracket 140 is supported from the support member 164 and the pin supported roller 162 is slidingly and rotatably received within the slotted bracket 168. The opposite ends of the support member 164 include depending supporting arms 170 and 172 corresponding to the arms 70 and 72 and the lower ends of the arms 170 and 172 support the opposite ends of a hacksaw blade 174 therefrom, the lower terminal ends of the legs 144 and 146 being slotted as at 176 for guidingly engaging opposite ends of the saw blade 174.

The brace 150 removably supports a chain guide 178 therefrom including an arcuate guide plate portion 180 and a combined bracing arm and clamp assembly is generally referred to by the reference numeral 182. One end of the assembly 182 includes a bore 184 formed therethrough in which the upper end of the shaft 154 is rotatably journaled and the other end of the assembly 182 includes an adjustable strap clamp 186 for clampingly engaging the vertically shiftable follower 188 of a drill press referred to in general by the reference numeral 190 and including a rotatable chuck 192 vertically shiftable with the follower 188 and clampingly engageable with the upper end of the shaft 152.

The operation of the attachment 140 is substantially identical to the operation of the attachment 10, except that the shaft 152 is driven from the chuck 192 of the drill press 190 instead of being driven by the chuck 136 of the drill 130. Further, the shaft 152 is directly driven from the chuck 192 as opposed to driving the sprocket wheel 44 by the drill 130 through a worm gear assembly comprising the gear 58 and wheel 60. The clamp assembly 182 is extremely important for ease of operation of the attachment 140 in that the assembly 182 is stationarily supported from the follower 188 and rotatably journals the upper end of the shaft 154, thus maintaining the frame 42 against angular displacement about the axis of rotation of the shaft 152.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A reciprocal saw accessory for a tool including a rotary output shaft, said accessory including support structure having guide means defining guide portions spaced along a predetermined path, an elongated support member having longitudinally spaced portions thereof guidingly supported from said guide portions for rectilinear reciprocation of said support member relative to said support structure, said support member including tool mounting structure for supporting an elongated cutting tool therefrom with said tool paralleling said path, a pair of rotary input and idle wheels journaled from said support structure for rotation about parallel axes spaced apart along said path, an endless tension member trained about said wheels, one of said wheels including means for drivingly connecting a rotary power output shaft thereto, first pin means and second slot defining means, one of said first and second means being carried by said tension member and the other of said first and second means being carried by said support member with said first and second means defining a pin and slot connection between said tension member and support member for reciprocal movement of the latter responsive to said tension member orbiting about said wheels.

2. The combination of claim 1 wherein said slot defining means is carried by said support member and said pin means is carried by said tension member.

3. The combination of claim 1 wherein said support structure includes a generally U-shaped frame defining a pair of generally parallel legs interconnected at one pair of corresponding ends by a bight portion extending therebetween, an elongated brace extending and secured between longitudinal midportions of said legs, a pair of generally parallel shafts extending between and journaled from said bight portion and brace and spaced along the latter, said wheels being mounted on said shafts for rotation therewith.

4. The combination of claim 3 wherein said shafts project through said brace and said wheels are disposed on the side of said brace remote from said bight portion.

5. The combination of claim 4 wherein said guide means are carried by the end portions of said legs on the side of said brace remote from said bight portion.

6. The combination of claim 5 wherein the opposite ends of said support member, on remote sides of said legs, include laterally directed support arms on the side of said support member remote from said bight portion and generally paralleling said legs, the outer ends of said support arms defining said tool mounting structure.

7. The combination of claim 6 wherein the other pair of corresponding ends of said legs include guide structure for guidingly engaging opposite end portions of said cutting tool.

8. The combination of claim 1 wherein said support structure includes a generally U-shaped frame defining a pair of generally parallel legs interconnected at one pair of corresponding ends by a bight portion extending therebetween, a bracing member extending between and interconnecting one set of corresponding sides of the adjacent base ends of said legs, said wheels being journaled from said bracing member for rotation about parallel axes disposed generally normal to the plane of said U-shaped member, said guide means being carried by said legs on the side of said axes remote from said bight portion.

9. The combination of claim 8 wherein the opposite ends of said support member, on remote sides of said legs, include laterally directed support arms on the side of said support member remote from said bight portion and generally paralleling said legs, the outer ends of said support arms defining said tool mounting structure.

10. The combination of claim 9 wherein the other pair of corresponding ends of said legs include guide structure for guidingly engaging opposite end portions of said cutting tool.

11. The combination of claim 1 wherein one of said wheels is carried by a shaft portion journaled from said frame, a worm wheel mounted on said shaft portion, a worm gear journaled from said support structure and meshed with said worm wheel, said shaft portion including means for transferring rotary torque thereto from a rotary power shaft.

12. The combination of claim 1 wherein said support structure includes mounting means operative to removably stationarily mount a powered hand drill therefrom including a rotary output shaft and means operative to establish a driving connection between said rotary output shaft and said input wheel.

13. The combination of claim 12 wherein said mounting means includes a frame having interconnected opposite side and end members, one of said end members including an arcuate midportion opening toward the other end member, an elongated clamp member extending longitudinally between said side members and including opposite end portions guidingly engaged with said side members for movement therealong, a clamp screw including a first end portion journaled from the longitudinal midportion of said clamp member against axial shifting relative thereto and a second threaded end portion threadingly engaged with said other end member, said clamp member defining a recess opposing and opening toward said one end member, whereby remote sides of the body of a hand drill may be seatingly engaged in said recess and arcuate midportion and clamped there between.

14. The combination of claim 13 wherein said frame includes a clamp-type mounting shank supported therefrom disposed normal to said clamp screw and generally paralleling the medial plane of said frame.

15. The combination of claim 14 wherein said mounting shank and one of said side members include coacting portions supporting said mounting shank from said one side member for adjustable shifting therealong.

16. A reciprocal saw accessory for a tool including a rotary output shaft, said accessory including support structure having guide means defining guide portions spaced along a predetermined path, an elongated support member having longitudinally spaced midportions thereof guidingly supported from said guide portions for rectilinear reciprocation of said support member relative to said support structure, said support member including tool mounting structure for supporting an elongated cutting tool therefrom with said tool paralleling said path, a pair of rotary input and idle shafts journaled from said support structure for rotation about parallel axes spaced apart along said path, a pair of input and idle wheels mounted on said shafts, an endless tension member trained about said wheels, one of said wheels including means for drivingly connecting a rotary power shaft thereto, first pin means and second slot defining means, one of said first and second means being carried by said tension member and the other of said first and second means being carried by said support member with said first and second means defining a pin and slot connection between said tension member and support member for reciprocal movement of the latter responsive to said tension member orbiting about said wheels.

17. The combination of claim 16 wherein one of said shafts includes an extended end portion and the other of said shafts is adapted to be chucked in the rotary chuck of a drill press head, and a brace arm including means journaling said extended shaft end portion one one end and attaching means on the other end for supportive attachment to said drill press head.

18. The combination of claim 17 wherein said attaching means includes adjustable clamp structure for removably clampingly engaging said drill press head.

19. The combination of claim 18 wherein said support structure includes a generally U-shaped frame defining a pair of generally parallel legs interconnected at one pair of corresponding ends by a bight portion extending therebetween, a bracing member extending between and interconnecting one set of corresponding sides of the adjacent base ends of said legs, said wheels being journaled from said bracing member for rotation about parallel axes disposed generally normal to the plane of said U-shaped member, said guide means being carried by said legs on the side of said axes remote from said bight portion, and clamp structure shiftably supported from said U-shaped frame for movement toward and away from said bight portion along a path generally paralleling said legs, said clamp structure being disposed between said legs.

* * * * *